United States Patent
Goud Gadela et al.

(10) Patent No.: US 11,323,371 B1
(45) Date of Patent: May 3, 2022

(54) MICRO SID PACKET PROCESSING WITH OPERATIONS, ADMINISTRATION, AND MANAGEMENT

(71) Applicant: Juniper Networks, Inc., Sunnyvale, CA (US)

(72) Inventors: Sri Karthik Goud Gadela, Cupertino, CA (US); Swamy Sadashivaiah Renu Kananda, Sunnyvale, CA (US); Ronald P. Bonica, Sterling, VA (US); Salih K A, Bengaluru (IN); Deepti Nirmalkumarji Rathi, Bangalore (IN); Rajesh Shetty Manur, Bangalore (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/248,534

(22) Filed: Jan. 28, 2021

(51) Int. Cl.
| | |
|---|---|
| *G06F 15/173* | (2006.01) |
| *H04L 45/745* | (2022.01) |
| *H04L 45/00* | (2022.01) |
| *H04L 12/46* | (2006.01) |
| *H04L 43/10* | (2022.01) |
| *H04L 45/42* | (2022.01) |

(52) U.S. Cl.
CPC ........ *H04L 45/745* (2013.01); *H04L 12/4633* (2013.01); *H04L 43/10* (2013.01); *H04L 45/42* (2013.01); *H04L 45/566* (2013.01)

(58) Field of Classification Search
CPC ..... H04L 45/745; H04L 45/42; H04L 45/566; H04L 12/4633; H04L 43/10
USPC .................................. 709/238, 231, 236, 234
See application file for complete search history.

(56) References Cited

U.S. PATENT DOCUMENTS

2018/0205641 A1* 7/2018 Pignataro ................ H04L 45/38
2021/0320884 A1* 10/2021 Filsfils ................ H04L 49/3009

OTHER PUBLICATIONS

Filsfils et al., "SRv6 Network Programming" draft-ietf-spring-srv6-network-programming-28, SPRING, Internet-Draft, Dec. 29, 2020, 44 pp.
Filsfils et al., "Network Programming extension: SRv6 uSID instruction," draft-filsfils-spring-net-pgm-extension-srv6-usid-08, Internet-Draft, Network Working Group, Nov. 2, 2020, 22 pp.
Cheng et al., "Compressed SRv6 Segment List Encoding in SRH" draft-filsfilscheng-spring-srv6-srh-comp-sl-enc-02, SPRING, Internet-Drall, Nov. 17, 2020,13 pp.

(Continued)

*Primary Examiner* — Lan Dai T Truong
(74) *Attorney, Agent, or Firm* — Shumaker & Sieffert, P.A.

(57) ABSTRACT

This disclosure describes techniques for using Operations, Administration, and Management (OAM) operations when routing packets using micro SIDs in segment routing. For example, a network device comprises one or more processors configured to: receive a packet; determine whether the packet is encapsulated with one or more micro segment identifiers (SIDs); in response to a determination that the packet is not encapsulated with one or more micro SIDs, determine whether the packet has reached a segment routing tunnel endpoint; and in response to a determination that the packet has reached the segment routing tunnel endpoint, initiate Operations, Administration, and Maintenance (OAM).

20 Claims, 3 Drawing Sheets

(56) References Cited

OTHER PUBLICATIONS

Ginsberg et al., "BGP—Link State (BGP-LS) Advertisement of IGP Traffic Engineering Performance Metric Extensions" RFC 8571, Internet Engineering Task Force (IEIF), Mar. 2019, 10 pp.

Vasseur et al., "Path Computation Element (PCE) Communication Protocol (PCEP)," RFC 5440, Network Working Group, Mar. 2009, 87 pp.

Enns et al., "Network Configuration Protocol (NETCONF)," RFC 6241, Internet Engineering Task Force, IETF, Jun. 2011, 113 pp.

Filsfils et al., "Segment Routing Architecture," draft-filsfils-rtgwg-segment-routing-00, Network Working Group, Internet-Draft, Jun. 28, 2013, 28 pp.

Filsfils et al., "Segment Routing Use Cases draft-filsfils-rtgwg-segment-routing-use-cases-01," Internet-Draft, Network Working Group, Jul. 14, 2013, 46 pp.

Filsfils et al., "Segment Routing Architecture," draft-filsfils-spring-segment-routing-04, Internet-Draft, Network Working Group, Jul. 3, 2014, 18 pp.

Previdi et al., "Source Packet Routing in Networking (SPRING) Problem Statement and Requirements," RFC 7855, Internet Engineering Task Force (IEIF), May 2016, 19 pp.

Filsfils et al., "Segment Routing with MPLS data plane," draft-filsfils-spring-segment-routing-mpls-03, Internet-Draft, Network Working Group, Jul. 31, 2014, 14 pp.

Moy, "OSPF Version 2," Network Working Group, RFC 2328, Apr. 1998, 244 pp.

Coltun et al., "OSPF for IPv6," RFC 5340, Network Working Group, Jul. 2008, 94 pp.

Sheth et al., "OSPF Hybrid Broadcast and Point-to-Multipoint Interface Type," RFC 6845, Internet Engineering Task Force, IETF, Jan. 2013, 9 pp.

Lindem et al., "OSPFv3 LSA Extendibility draft-acee-ospfv3-lsa-extend-01.txt," Internet-Draft, Network Working Group, Jul. 15, 2013, 27 pp.

Oran, "OSI IS-IS Intra-domain Routing Protocol," RFC 1142, Network Working Group, Feb. 1990, 157 pp.

Li et al., "IGP Requirements for Traffic Engineering with MPLS" draft-li-mpls-igp-te-00.txt, Network Working Group, Internet Draft, Feb. 1999, 6 pp.

U.S. Appl. No. 17/247,955, entitled "Micro SID Packet Processing," Juniper Networks Inc. (inventor: Shaw) filed Dec. 31, 2020.

ITU-T G.8013/Y.1731, "Operation, administration and maintenance (OAM) functions and mechanisms for Ethernet-based networks—Recommendation ITU-T G.8013/Y.1731," Telecommunication Standardization Sector of ITU—International Telecommunication Union, Aug. 2015, 102 pp.

"IEEE Standard for Local and Metropolitan Area Networks, IEEE Std 802.1ag™-2007—Virtual Bridged Local Area Networks—Amendment 5: Connectivity Fault Management," IEEE Computer Society, LAN/MAN Standards Committee, Dec. 7, 2007, 260 pp.

* cited by examiner

MICRO SID PACKET PROCESSING WITH OPERATIONS, ADMINISTRATION, AND MANAGEMENT

TECHNICAL FIELD

The disclosure relates to computer networks and, more particularly, to measuring parameters on engineered traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices (i.e., nodes) within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain. The contents of a Link State Database (LSDB) or a Traffic Engineering Database (TED) maintained in accordance with a link state routing protocol have the scope of an IGP domain. IGP routing protocols typically require that all routers in the IGP routing domain store within an internal LSDB or TED all of the routing information that has been distributed according to the IGP protocol. In operation, each router typically maintains an internal link state database and scans the entire database at a defined interval to generate and output link state messages to synchronize the database to neighboring routers within the routing domain. In this way, link state is propagated across the entire routing domain and stored in full at each router within the domain.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP), the Resource Reservation Protocol (RSVP) with Traffic Engineering extensions (RSVP-TE), or the Segment Routing (SR) extension, label switching routers can forward traffic along a particular path through a network to a destination device, i.e., a Label Switched Path (LSP), using labels prepended to the traffic. An LSP defines a distinct path through the network to carry MPLS packets from the source device to a destination device. Using a MPLS protocol, each router along an LSP allocates a label in association with the destination and propagates the label to the closest upstream router along the path. Routers along the path add (push), remove (pop) or swap the labels and perform other MPLS operations to forward the MPLS packets along the established path.

Routers may employ source packet routing techniques (otherwise referred to as "segment routing"), such as by using a Source Packet Routing in Networking (SPRING) paradigm, that provides segment routing within an IGP domain to advertise single or multi-hop LSPs. SPRING includes multiple different label types including "adjacency" labels and "node" labels. To forward a packet through the network, the routers may push (and pop) one or more labels in a label stack, e.g., a segment list, that is applied to the packet as it is forwarded through the network. Routers may also employ micro segment identifiers (SIDs) which may occupy less space in a packet header than traditional SIDs.

SUMMARY

In general, this disclosure describes techniques for using Operations, Administration, and Management (OAM) operations when routing packets using micro SIDs in segment routing. As described herein, a network device may receive advertisements originated by other network devices in a network. Each respective advertisement may specify a respective prefix and a respective SID and/or micro SID. The respective prefix may be an address or block of addresses. For instance, the respective prefix may specify an Internet Protocol (IP) address or block of IP addresses. Typically, in response to receiving an advertisement, the network device determines a route through the network to the prefix specified by the advertisement. Additionally, the network device associates the SID or the micro SID with the route. Subsequently, when the network device receives a packet with the SID or micro SID attached, the network device typically forwards the packet to a next hop along the determined route associated with the SID or micro SID. The techniques of this disclosure enable network devices to implement OAM operations when routing packets using micro SIDs in segment routing.

In one example, this disclosure describes a method comprising receiving, by a network device enabled to use micro segment identifiers (SIDs), a packet. The method also includes determining, by the network device, whether the packet is encapsulated with one or more micro SIDs. The method further includes, in response to determining the packet is not encapsulated with one or more micro SIDs, determining, by the network device, whether the packet has reached a segment routing tunnel endpoint. Moreover, the method includes, in response to determining that the packet has reached the segment routing tunnel endpoint, initiating, by the network device, one or more Operations, Administration, and Maintenance (OAM) operations.

In another example, this disclosure describes a network device comprising one or more processors configured to: receive a packet; determine whether the packet is encapsulated with one or more micro segment identifiers (SIDs); in response to a determination that the packet is not encapsulated with one or more micro SIDs, determine whether the packet has reached a segment routing tunnel endpoint; and in response to a determination that the packet has reached the segment routing tunnel endpoint, initiate one or more Operations, Administration, and Maintenance (OAM) operations.

In another example, this disclosure describes a non-transitory computer-readable medium comprising instructions that, when executed, cause processing circuitry of a network device to: receive a packet; determine whether the packet is encapsulated with one or more micro segment identifiers (SIDs); in response to a determination that the packet is not encapsulated with one or more micro SIDs, determine whether the packet has reached a segment routing tunnel endpoint; and in response to a determination that the packet has reached the segment routing tunnel endpoint, initiate one or more Operations, Administration, and Maintenance (OAM) operations.

The details of one or more examples are set forth in the accompanying drawings and the description below. Other features, objects, and advantages will be apparent from the description, drawings, and from the claims.

DETAILED DESCRIPTION

Figure 1:
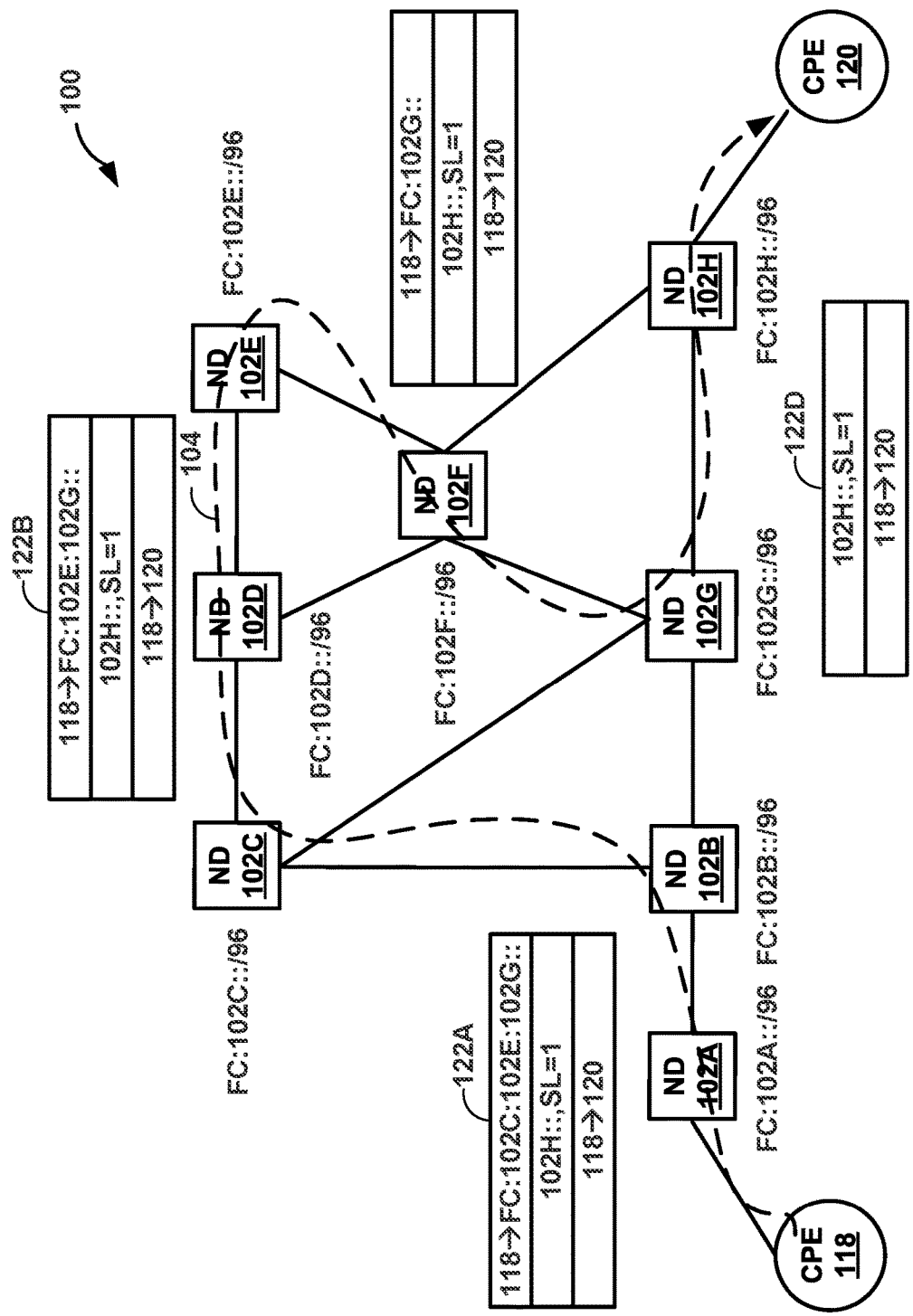
FIG. 1 is a block diagram illustrating an example network that supports implementing OAM operations when routing packets using micro SIDs in segment routing, in accordance with techniques described in this disclosure.

FIG. 1 is a block diagram illustrating an example network 100 that supports implementing OAM operations when routing packets using micro SIDs in segment routing, in accordance with techniques described in this disclosure. Segment Routing is a control-plane architecture that enables an ingress router to steer a packet through a specific set of nodes and links in a network.

In the example of FIG. 1, network 100 includes network devices 102A-102H (collectively, "network devices 102"). In some examples, network devices may represent routers, switches, or any device configured to route packets using micro SIDs in segment routing. In some examples, network device 102A may be an ingress router. The sources of the network traffic received by ingress router 102A may comprise one or more devices, such as customer premises equipment (CPE) 118 and/or any public or private network or the Internet that provides traffic to network device 102A in network 100. Furthermore, in some examples, network device 102H may be an egress router. The destinations of the network traffic being forwarded on LSPs may comprise one or more destination devices, such as CPE 120 and/or networks that may include LANs or wide area networks (WANs) that comprise a plurality of devices. For example, destination devices may include personal computers, laptops, workstations, personal digital assistants (PDAs), wireless devices, network-ready appliances, file servers, print servers or other devices that access the source via network 100.

In the example of FIG. 1, network devices 102 may use segment routing techniques, e.g., Source Packet Routing in Networking (SPRING) paradigm. For example, segment routing techniques are used to configure labels for paths from ingress router 102A to egress router 102H. Segment routing within an Internal Gateway Protocol (IGP) domain (e.g., network 100) allows routers to advertise single or multi-hop LSPs within the IGP domain such as a segment routing LSP. In other words, segment routing may engage IGPs for advertising two types of network segments (e.g., tunnels). First, a strict-forwarded 1-hop tunnel that carries packets over a specific link between two nodes, irrespective of the link cost (hereafter shall be referred to as "adjacency segments"). Second, a multi-hop tunnel using shortest path links between two specific nodes or to a specific prefix (hereafter shall be referred to as "prefix segments"). Example IGPs include Intermediate System-Intermediate System (IS-IS) and Open Shortest Path First (OSPF).

For segment routing within prefix segments, the "path" information is disseminated between the routers as part of the IGP link state information for the domain. Ingress router 102A is able to steer a packet through a controlled set of instructions, called segments, by prepending one or more segment identifiers (SIDs) to the packet (e.g., as part of a segment routing header (SRH)). In other words, ingress router 102A can steer a packet through a desired set of nodes and links by prepending the packet with an appropriate combination (stack) of SIDs (otherwise referred to herein as "label stack"). Segment routing allows routers to enforce a flow through any topological path and service chain while maintaining per-flow state only at the ingress node to the segment routing domain.

One potential advantage of segment routing may be that the segment routing architecture can be directly applied to the Multi-protocol Label Switching (MPLS) data plane with no change in the forwarding plane. A network administrator need only allocate SIDs to particular routers and the segment routing IGP control-plane automatically builds the required MPLS forwarding constructs from a router to any other router. Segment routing is further described in Filsfils et. al., "Segment Routing Architecture," Internet-Draft draft-fils-fils-rtgwg-segment-routing-00, June 2013, while Segment Routing use cases are described in Filsfils et. al., "Segment Routing Use Cases," Internet-Draft draft-filsfils-rtgwg-segment-routing-use-cases-01, July 2013. Further details regarding SPRING are found in (1) "Segment Routing Architecture," IETF draft: draft-filsfils-spring-segment-routing-04, Jul. 3, 2014; (2) S. Previdi, et al., "Source Packet Routing in Networking (SPRING) Problem Statement and Requirements," RFC 7855, May 2017; and (3) "Segment Routing with MPLS data plane," IETF draft: draft-filsfils-spring-segment-routing-mpls-03, Jul. 31, 2014.

Each of network devices 102 may be associated with a prefix. For instance, an administrator may assign prefixes to routers. A prefix may be an address or block of addresses. The prefix corresponding to a node (e.g., a network device) may comprise an Internet Protocol (IP) address, block of IP addresses, or other type of data identifying the node. Additionally, one or more of network devices 102 may be configured with a SID. In some examples, network devices 102 are configured with prefixes and SIDs by manual configuration. A network device in network 100 may advertise its prefix and SID to other network devices 102 in network 100. In other words, the network device may originate an advertisement specifying a prefix and a SID. For example, network devices 102D may advertise that its prefix is 2.2.2.33/32 and that its SID is 1063. To advertise a prefix and SID, a network device may send messages to neighboring network devices specifying the prefix and the SID. For example, network device 102D may send message to network devices 102C, 102E, and 102F.

When a network device receives an advertisement, the network device may forward the advertisement to neighboring network devices. For example, if network device 102C receives an advertisement from network device 102D, network device 102C may forward the advertisement to network device 102B. In this way, eventually each of network devices 102 receives the advertisement. A network device that merely forwards an advertisement is not considered to originate the advertisement. Additionally, when a network device receives an advertisement, the network device determines whether the prefix specified in the advertisement is already associated with the SID specified in the advertisement. If this is the case and if the advertisement represents a new best path, the network device may update a routing table in response to the advertisement such that the routing table indicates a next hop in the route to the prefix. If the advertisement represents an equal cost compared to the existing route, the network device may add an equal-cost multi-path (ECMP) next hop to the existing route.

However, if the advertisement specifies a prefix and a SID that are not already in the network device's link state database (LSDB), the network device may calculate a route to the prefix specified in the advertisement. For example, if network device 102C receives an advertisement that specifies a prefix assigned to network device 102H, network device 102C may calculate a route through network 100 to network device 102H (e.g., via network device 102C and network device 102D). In some examples, the network device may calculate the route according to a shortest path algorithm or a strict shortest path algorithm. Furthermore, in some examples, an advertisement may specify the type of algorithm to use to calculate the route to the prefix specified in the advertisement. Additionally, the network device may associate the SID specified by the advertisement with the calculated route to the prefix specified by the advertisement. In other words, the network device may generate data that associate the SID with the route. The network device may then install the route as an active route. Installing a route as an active route may comprise generating forwarding information that a forwarding component of the network device may use to forward packets to next hops of routes associated with SIDs attached to the packets. For instance, installing the route as an active route may comprise generating information in a forwarding table that maps a SID to an interface card attached to a link to a next hop of the route associated with the SID.

After installing a route as an active route, a network device may receive a packet. In response to receiving the packet, the network device may determine whether a stack of one or more labels is attached to the packet. The stack of labels comprises an ordered sequence of labels. If there is no stack of labels attached to the packet when the network device receives the packet or if there are no remaining labels attached to the packet after the network device removes the active label, the network device forwards the packet to another node in the network without further use of segment routing. For instance, the network device may forward the packet according to an IP address of the packet.

However, if the stack of labels still includes one or more labels, the network device may determine a next hop of a route associated with the active label of the label stack. The active label may be the label at the "top" of the label stack. For instance, the active label may be the label occurring first in an ordered sequence of labels attached to the packet. If the next hop of the route associated with the active label advertised the active SID, the network device may remove the active label from the label stack attached to the packet, potentially leaving one or more labels remaining attached to the packet. In other words, the network device may "pop" the active label from the label stack. For example, if network device 102C is assigned with a SID of "1064" and network device 102C receives a packet with the following labels attached, "1063" and "1040," network device 102C may remove the label "1063" from the packet and leave the label "1040" attached to the packet.

The network device may then forward the packet, along with the remaining labels of the label stack, to a next hop on the route associated with the active label. For example, suppose network device 102C advertised a prefix of 2.2.2.33/32 and a SID of "1063." In this example, network device 102A may determine, based on network topology data stored by network device 102A, a route to network device 102C. In this example, the determined route may go from network device 102A to network device 102B to network device 102C. Additionally, in this example, network device 102A may associate the determined route with SID "1063." Subsequently, assuming that network device 102A was not itself assigned the SID "1063," if network device 102A receives a packet with an active label equal to "1063," network device 102A may forward the packet to network device 102B to reach network device 102C. Network device 102B performs a similar process to forward the packet to network device 102C.

This system may allow a source node, such as ingress router 102A, to control the path a packet takes through network 100. For example, assume ingress router 102A is configured to send a packet to egress router 102H via route 104 (shown with a dashed line) through network devices 102C-102G. Furthermore, in this example, assume network device 102C is assigned a SID of "1063" and network device 102H is assigned with a SID of "1062." Accordingly, in this example, network device 102A may receive advertisements specifying a prefix of network device 102C and the SID "1063," and a prefix of network device 102H and the SID "1062," respectively. Network device 102A then determines a route to network device 102H and associates the determined route with SID "1063" to reach network device 102C and SID "1062" to reach network device 102H. In this example, network device 102A may push the SID "1062" onto a label stack attached to the packet and may then push the SID "1063" onto the label stack attached to the packet, where SID "1063" is the active label. Thus, network device 102A may steer a packet to go through network devices 102B-102G to reach network device 102H.

In networks implementing segment routing over an IPv6 data plane ("SRv6"), for example, an ingress router may steer a packet along a desired set of nodes and links by prepending the packet with one or more SIDs, where each SID has a format of 128-bits. An SRv6 SID may include a destination address (referred to as "locator"), function, and, in some examples, an argument. The locator is used to forward a packet to a specific node that instantiated the SID, which may execute a function. An argument may contain information related to a flow, service, or any other information required by the function associated with the SID.

When allocating SIDs within a segment routing domain, a network operator may assign a locator to each node (e.g., network devices 102) in the segment routing domain. For instance, a locator may be represented as "B:N" where "B" is a SID block (e.g., IPv6 prefix allocated for SRv6 SID) and "N" is an identifier of the node instantiating the SID, and may be the leftmost bits of the SID. The SID may also include a function "FUNCT" following the locator bits that identifies a local behavior bound to the SID (referred to herein as "endpoint behavior" or "END"). In some examples, the endpoint behavior may include the SRv6 instantiation of endpoint behavior of a node SID ("END"), the SRv6 instantiation of endpoint behavior of an adjacency SID ("END.X"), and/or other endpoint behaviors as described in C. Filsfils, Ed., et al., "SRv6 Network Programming, Internet-Draft, draft-ietf-spring-srv6-network-programming-28, Dec. 29, 2020, the entire contents of which is incorporated by reference herein (referred to herein as "SRv6 Network Programming draft"). In some examples, the endpoint behavior may require additional information for its processing (e.g., related to the flow or service). This information is encoded as argument bits. Each of network devices 102 may advertise a SID (e.g., B:N:FUNCT), including an endpoint behavior, in the control plane, and the source node of the segment routing domain (e.g., network device 102A) may use the advertised SIDs to steer a packet through segments by prepending one or more of the SIDS to the packet.

In some examples, instead of, or in addition to, having an associated SID, any of network devices 102 may have an associated micro SID ("uSID"). For example, network devices 102 may be configured to be micro SID aware. A micro SID is an extension of an segment routing network programming model in which the SID may operate as a micro SID container that includes one or more micro SIDs. For example, in the micro SID model, rather than representing a given segment with a 128-bit long SID, (such as is the case with a standard segment routing network), a micro SID may be used to represent a given segment. A micro SID may be of shorter length, such as 16-bits, but may be any length shorter than the 128-bits.

Multiple micro SIDs may be located within a SID and multiple SIDs may be located within a given label stack. For example, the micro SID container (e.g., encoded as the argument ("A") of an IPv6 header) may include an active micro SID, one or more next micro SIDs, and/or a last micro SID. The active micro SID may be the leftmost micro SID in the micro SID container, followed by one or more next micro SIDs (e.g., bits to the right of the active micro SID), and/or a last micro SID in the micro SID container. As one example, the micro SID container may have a format of <uSID-Block><Active-uSID)><Next-uSID> . . . <Last-uSID><End-of-Container> . . . <End-of-Container>. The micro SID container may be encoded in a destination address of an IPv6 header or at any position in the segment identifier (SID) list of a segment routing header.

In the example of FIG. 1, network device 102A is assigned with a micro SID of FC:102A::/96, network device 102B is assigned with a micro SID of FC:102B::/96, network device 102C is assigned with a micro SID of FC:102C::/96, and so on. Although described with /96 prefix length, the micro SID may be assigned with a different prefix length. The function of a micro SID may include shifting the destination address left by a number of bits, such as 16-bits, such that a next micro SID in the micro SID container is moved to a location in the header that was previously occupied by a prior micro SID. For example, when routing a packet having micro SIDs, a network device having a destination address that is specified in the leftmost micro SID of the micro SID container may consume (e.g., remove) the micro SID associated with the network device and left shift the remaining micro SIDs in the micro SID container so that the next micro SID in the micro SID container is located where the consumed micro SID was located immediately before consumption. Consuming the micro SID may include erasing the micro SID, writing over the micro SID, setting the bits to zero, or any other method which may result in the micro SID being removed from or not remaining in the micro SID container.

A flow of a packet through a micro SID aware network is now described. For example, CPE 118 may send the data bound for CPE 120 to network device 102A (which may be an example ingress router). Network device 102A may encapsulate the data sent by CPE 118 and apply one or more micro SIDs within a top label (e.g., micro SID container) as shown with packet 122A. For example, network device 102A may encapsulate the data sent by CPE 118 with a source address (e.g., 118) and destination addresses (e.g., encoded as a micro SID container as FC:102C:102E:102G::) (illustrated in FIG. 1 as 118→FC:102C:102E:102G::). In this example, the "FC" represents the locator and the argument includes the micro SIDs of network devices 102C (active micro SID), 102E (next micro SID), and 102G (last micro SID). The packet may be further encapsulated with a segment routing (SR) label for network device 102H::, segments left (SL)=1, and payload 118→120 (e.g., representing the data CPE 118 is to send to CPE 120).

Packet 122A may be sent through network 100 toward the network device identified by the active micro SID (e.g., left most micro SID of micro SID container). For example, packet 122A may be sent to network device 102B. Network device 102B may determine that the network device identified by the active micro SID in the micro SID container of packet 122A is network device 102C. Network device 102B may determine (e.g., from its forwarding information) the location of network device 102C based on advertisements sent by network device 102C to network device 102B. Network device 102B may route packet 122A to network device 102C as network device 102C matches the destination address of the active micro SID in the micro SID container of packet 122A. When network device 102C receives packet 122A, network device 102C may determine that the destination address of the active micro SID is network device 102C. Network device 102C may consume its micro SID and left shift the micro SIDs by a predetermined or identified number (e.g., in the micro SID) of bits or bytes, such as 16 bits (2 bytes). The micro SID container may now include 118→FC:102E:102G:: such that the next micro SID, e.g., FC:102E, is now the active micro SID, as shown in packet 122B.

Network device 102C may forward packet 122B to network device 102D as network device 102C may determine that network device 102D is between network device 102C and network device 102E based on advertisements sent by network device 102E and network device 102D. Network device 102D may determine that the active micro SID in the micro SID container of packet 122B is network device 102E. Network device 102D may forward packet 122B to network device 102E, as network device 102D may determine (e.g., from its forwarding information) the location of network device 102E based on advertisements sent by network device 102E. Network device 102E may determine that network device 102E is the active micro SID in the micro SID container of packet 122B. Network device 102E may consume its micro SID and left shift the micro SIDs by the predetermined number of bits or bytes, such as 16 bits (2 bytes). The micro SID container may now include 118→FC:102G:: such that the next micro SID, e.g., FC:102G, is now the active micro SID, as shown in packet 122C.

Network device 102E may forward packet 122C to network device 102F as network device 102E may determine that the active micro SID in the micro SID container is network device 102G and may determine that network device 102G is connected to network device 102F based on advertisements sent by network device 102G and network device 102F. Network device 112 may determine that the active micro SID in the micro SID container of packet 122C is network device 102G. Network device 102F may forward packet 122C to network device 102G and may determine the location of network device 102G based on advertisements sent by network device 102G. Network device 102G may determine that network device 102G is the active micro SID in the micro SID container of packet 122C. Network device 102G may consume its micro SID and left shift the micro SIDs by the predetermined or identified number of bits or bytes, such as 16 bits (2 bytes). As all the micro SIDs in the micro SID container in the top label has been consumed, network device 102G may pop the top label, resulting in the SR label 102H:: label being the top label as is shown in packet 122D. Network device 102G may determine the location of network device 102H based on advertisements sent by network device 102H and may forward packet 122D to network device 102H. Network device 102H may de-encapsulate SR label 102H to retrieve the payload (e.g., the data sent by CPE 118 to CPE 120). By placing several micro SIDs within a given SID, a packet's overhead may be dramatically reduced when multiple segments are being traversed in a segment routing version 6 (SRv6) packet. Additional examples of micro SID are described in U.S. application Ser. No. 17/247,955, entitled "MICRO SID PACKET PROCESSING," filed Dec. 31, 2020; C. Filsfils, Ed., et al., "Network Programming extension: SRv6 uSID instruction," Internet-Draft, "draft-filsfils-spring-net-pgm-extension-srv6-usid-08," Nov. 2, 2020; and W. Cheng, Ed., et al., "Compressed SRv6 Segment List Encoding in SRH," Internet-Draft, "draft-filsfilscheng-spring-srv6-srh-comp-sl-enc-02," Nov. 17, 2020, the entire contents of each of which is incorporated by reference herein.

In some examples, network devices may use Operations, Administration, and Maintenance (OAM) techniques, such as Connectivity Fault Management (CFM) as described in the Institute of Electrical and Electronics Engineers (IEEE) 802.1ag and International Telecommunications Union Telecommunications Standardization Sector Y.1731, entitled "OAM functions and mechanism for Ethernet based networks," dated May 2006, herein incorporated by reference in its entirety. OAM operations may generally enable discovery, link monitoring, fault detection, etc. within the network.

Typically, when implementing segment routing with an IPv6 data plane, network devices may indicate within the segment routing header to use OAM mechanisms (e.g., ping, traceroute, etc.). For example, if an ingress router wants to perform an OAM operation (e.g., ping or traceroute) for an IPv6 address via a label stack, the ingress router initiates the OAM operation with a segment routing header including a flag ("OAM flag") as a marking-bit in the packet to trigger OAM at the segment endpoints. As one example, a segment endpoint that receives a packet with a segment routing header including the OAM flag may export telemetry information for the data flow (e.g., to a controller for analysis). The segment endpoint may use, for example, IP Flow Information Export (IPFIX) protocol to export the telemetry information.

The implementation of micro SIDs, however, does not provide mechanisms to initiate an OAM operation. In accordance with the techniques described in this disclosure, network 100 provides the use of OAM operations when routing packets using micro SIDs in segment routing. As described in further detail below, network devices 102 may be configured to process whether to initiate an OAM operation when processing packets encapsulated with micro SIDs.

When implementing micro SIDs, an endpoint behavior for a given micro SID may be to instantiated, such as an endpoint behavior to process a packet encapsulated with a micro node SID ("uN") or an endpoint behavior to process a packet encapsulated with a micro adjacency SID ("uA"). As one example, a micro SID enabled network device (e.g., network devices 102) instantiated with an endpoint behavior to process micro node SID (uN) may be configured to implement OAM operations as shown in the following configuration:

```
If (DA.Argument != 0) {
    Copy DA.Argument into the bits [B..(B+A−1) ] of
    the Destination Address of the IPv6 header.
    Set the bits [ (B+A)..(B+NF+A−1) ] of the
    Destination Address of the IPv6 header to zero.
    Forward the packet to the new DA.
} else { // DA.Argument is 0
    When an SRH is present {
      If segments_left is 0 {
        Proceed to process the upper-layer header
      } else {
        Proceed to process with SRv6 processing
          (according to section 4.1 of SRv6
          Network Programming draft)
      }
    } else {
      // For cases that do not have SRH
      Proceed to process the upper-layer header
      (according to section 4.1.1 of SRv6
      Network Programming draft)
    }
}
```

With the configuration shown above, a network device may determine whether there are any micro SIDs in the destination address of the packet (e.g., encoded as micro SID container). If there is at least one micro SID in the destination address of the packet (e.g., DA.Argument !=0), the network device may shift the destination address left by a number of bits, such as 16-bits, such that a next micro SID in the micro SID container is moved to a location in the header that was previously occupied by a prior micro SID, and forward the packet to along the forwarding path. If the destination address of the packet does not include any micro SIDs (e.g., DA.Argument=0), the network device may determine whether the packet has reached the segment routing tunnel endpoint. Typically, a segment routing tunnel endpoint may perform one or more OAM operations to measure the performance of the entire segment routing tunnel. If the packet has reached the segment tunnel endpoint (e.g., segments_left is 0), the network device may initiate one or more OAM operations. For example, the network device may process an upper-layer header of the packet, wherein the upper-layer header is specified with a type (e.g., type 58) that instructs the network device to initiate OAM operations. If the network device is not a segment routing tunnel endpoint (e.g., segments_left is not 0), the network device processes the packet with SRv6 techniques, e.g., by loading the next SID in the segment routing header to the destination address and decrementing the segments_left value.

As one specific example operation of the techniques described in this disclosure, when network device 102C receives packet 122A encapsulated with a micro SID container including micro SIDs identifying network devices 102C, 102E, and 102G, network device 102C consumes its micro SID in the micro SID container and determines whether the argument value of the destination address field (e.g., encoded as the micro SID container) of the packet is not zero (e.g., DA.Argument !=0). In this example, network device 102C determines that the destination address field is not zero (e.g., the argument value of destination address field includes micro SIDs for network devices 102E and 102G) and in response, left shifts the micro SIDs (e.g., from FC:102C:102E:102G:: to FC:102E:102G::) and forwards packet 122B along the forwarding path (e.g., path 104) toward the network device associated with the active micro SID (e.g., network device 102E).

Similarly, when network device 102E receives packet 122B, network device 102E consumes its micro SID in the micro SID container and determines that the destination address field is not zero (e.g., argument value of destination address field includes micro SID for network device 102G). In response, network device 102E left shifts the micro SIDs (e.g., from FC:102E:102G:: to FC:102G::) and forwards packet 122C along the forwarding path (e.g., path 104) toward the network device associated with the active micro SID (e.g., network device 102G).

When network device 102G receives packet 122C, network device 102G consumes its micro SID in the micro SID container and determines that the destination address field is zero (e.g., argument value of the destination address field does not include any micro SIDs). In response, network device 102G processes the packet with SRv6 processing. For example, network device 102G determines whether network device 102G is the segment routing tunnel endpoint (e.g., segments_left is 0). In this example, network device 102G determines that the packet has not reached the segment routing tunnel endpoint (e.g., segments_left is not 0) and loads the next SID in the segment routing header (e.g., SR label for network device 102H) to the destination address and decrements the segments_left value to zero. For example, if network device 102G determines that the packet has not reached the segment routing tunnel endpoint (e.g., segments_left is not 0), the network device may process the packet encapsulated with a micro node SID with SRv6 techniques, such as to process a next header (e.g., next SID in the segment routing header) in the packet and forwarding the packet to the network device associated with the next SID. As one example, the network device may process the packet in accordance with section 4.1 of the SRv6 Network Programming draft, as follows:

```
When a segment routing header (SRH) is processed {
    If (segments_left == 0) {
        Stop processing the SRH, and proceed to
            process the next header in the
            packet, whose type is identified by
            the Next Header field in the routing
            header.
    }
    If (IPv6 Hop Limit <= 1) {
        Send an ICMP Time Exceeded message to the
            Source Address, Code 0 (Hop limit
            exceeded in transit), interrupt
            packet processing and discard the
            packet.
    }
    max_LE = (Hdr Ext Len / 2) - 1
    If ((Last Entry > max_LE) or (segments_left >
        Last Entry+1)) {
        Send an ICMP Parameter Problem to the
            Source Address, Code 0 (Erroneous
            header field encountered), Pointer
            set to the Segments Left field,
            interrupt packet processing and
            discard the packet.
    }
    Decrement IPv6 Hop Limit by 1
    Decrement segments_left by 1
```

```
    Update IPv6 DA with Segment List[segments_left]
    Submit the packet to the egress IPv6 FIB lookup
        and transmission to the new destination
}
```

When the segment routing tunnel endpoint, e.g., network device 102H, receives packet 122D, network device 102H determines that the destination address field is zero (e.g., DA.Argument=0) and determines that the packet has reached the segment routing tunnel endpoint (e.g., segments_left is 0). In response to determining that the packet has reached the segment routing tunnel endpoint, network device 102H may initiate OAM operations. For example, network device 102H may process an upper-layer header (e.g., specifying a type of 58 which indicates the node is to ping SIDs using ICMPv6) of the packet to initiate OAM operations, such as in accordance with section 4.1.1 of the SRv6 Network Programming draft, as shown below:

```
If (Upper-Layer Header type is allowed by local
    configuration) {
        Proceed to process the Upper-layer Header
} Else {
        Send an ICMP Parameter Problem to the Source
Address, Code 4 (SR Upper-layer Header Error),
Pointer set to the offset of the Upper-layer Header,
Interrupt packet processing and discard the packet.
}
```

In some examples, if the destination address of the packet does not include any further micro SIDs (e.g., DA.Argument=0) and the packet does not have a segment routing header, the network device may initiate OAM operations, e.g., by processing the upper-layer header of the packet in accordance with section 4.1.1 of the SRv6 Networking Programming draft.

Alternatively, or additionally, a micro SID enabled network device may be configured with an endpoint behavior to process a packet encapsulated with a micro adjacency SID (uA) to implement OAM operations as follows:

```
If (DA.Argument != 0) {
    Copy DA.Argument into the bits [B..(B+A-1) ]of
        the Destination Address of the IPv6 header.
    Set the bits [ (B+A)..(B+NF+A-1) ] of the
        Destination Address of the IPv6 header to zero.
    Forward to the layer-3 adjacency as provided by
        the uA SID.
} else { // DA.Argument is 0
    When an SRH is present {
        If segments_left is 0 {
            Proceed to process the upper-layer header
        } else {
            Proceed to process with SRv6
                processing(according to section 4.2
                of SRv6 Network Programming draft)
        }
    } else {
        // For cases that do not have SRH
        Proceed to process the upper-layer header
            (according to section 4.1.1 of SRv6
            Network Programming draft)
    }
}
```

In this example, a network device configured with an endpoint behavior to instantiate a micro adjacency SID may receive a packet including one or more micro SIDs and if the network device determines that the destination address field is not zero (e.g., DA.Argument !=0), the network device shifts the destination address left by a number of bits such that a next micro SID in the prefix is moved to a location in the header that was previously occupied by a prior micro SID, and forwards the packet toward the next micro SID. If the network device determines that the destination address field is zero (e.g., DA.Argument is 0), the network device further determines whether the packet has reached the segment routing tunnel endpoint (e.g., segments_left is 0). If the network device determines that the packet has reached the segment routing tunnel endpoint, the network device may initiate OAM operations (e.g., by processing an upper-layer header (e.g., specifying a type of 58 which indicates the node is to ping SIDs using ICMPv6) of the packet to initiate OAM operations, in accordance with section 4.1.1 of the SRv6 Network Programming draft, incorporated above). If the network device determines that the packet has not reached the segment routing tunnel endpoint (e.g., segments_left is not 0), the network device may process the packet encapsulated with a micro adjacency SID with SRv6 techniques, such as to process a next header (e.g., next SID in the segment routing header) in the packet and forwarding the packet to the network device associated with the next SID. As one example, the network device may process the packet in accordance with section 4.2 of the SRv6 Network Programming draft, as shown below:

```
When a segment routing header(SRH) is processed {
    If (segments_left == 0) {
        Stop processing the SRH, and proceed to
          process the next header in the
          packet, whose type is identified by
          the Next Header field in the routing
          header.
    }
    If (IPv6 Hop Limit <= 1) {
        Send an ICMP Time Exceeded message to the
          Source Address, Code 0 (Hop limit
          exceeded in transit), interrupt
          packet processing and discard the
          packet.
    }
    max_LE = (Hdr Ext Len / 2) - 1
    If ((Last Entry > max_LE) or (segments_left >
      Last Entry+1) ) {
        Send an ICMP Parameter Problem to the
          Source Address, Code 0 (Erroneous
          header field encountered), Pointer
          set to the Segments Left field,
          interrupt packet processing and
          discard the packet.
    }
    Decrement IPv6 Hop Limit by 1
    Decrement segments_left by 1
    Update IPv6 DA with Segment List[segments_left]
    Submit the packet to the IPv6 module for
      transmission to the new destination via a
      member of a set of one or more Layer 3
      adjacencies
}
```

In some examples, if the destination address of the packet does not include any further micro SIDs (e.g., DA.Argument=0) and the packet does not have a segment routing header, the network device may initiate OAM operations, e.g., by processing the upper-layer header of the packet in accordance with section 4.1.1 of the SRv6 Networking Programming draft.

In this way, routers that are micro SID enabled and configured with an endpoint behavior to instantiate a micro node SID (uN) and/or micro adjacency SID (uA) may also implement OAM operations.

Figure 2:
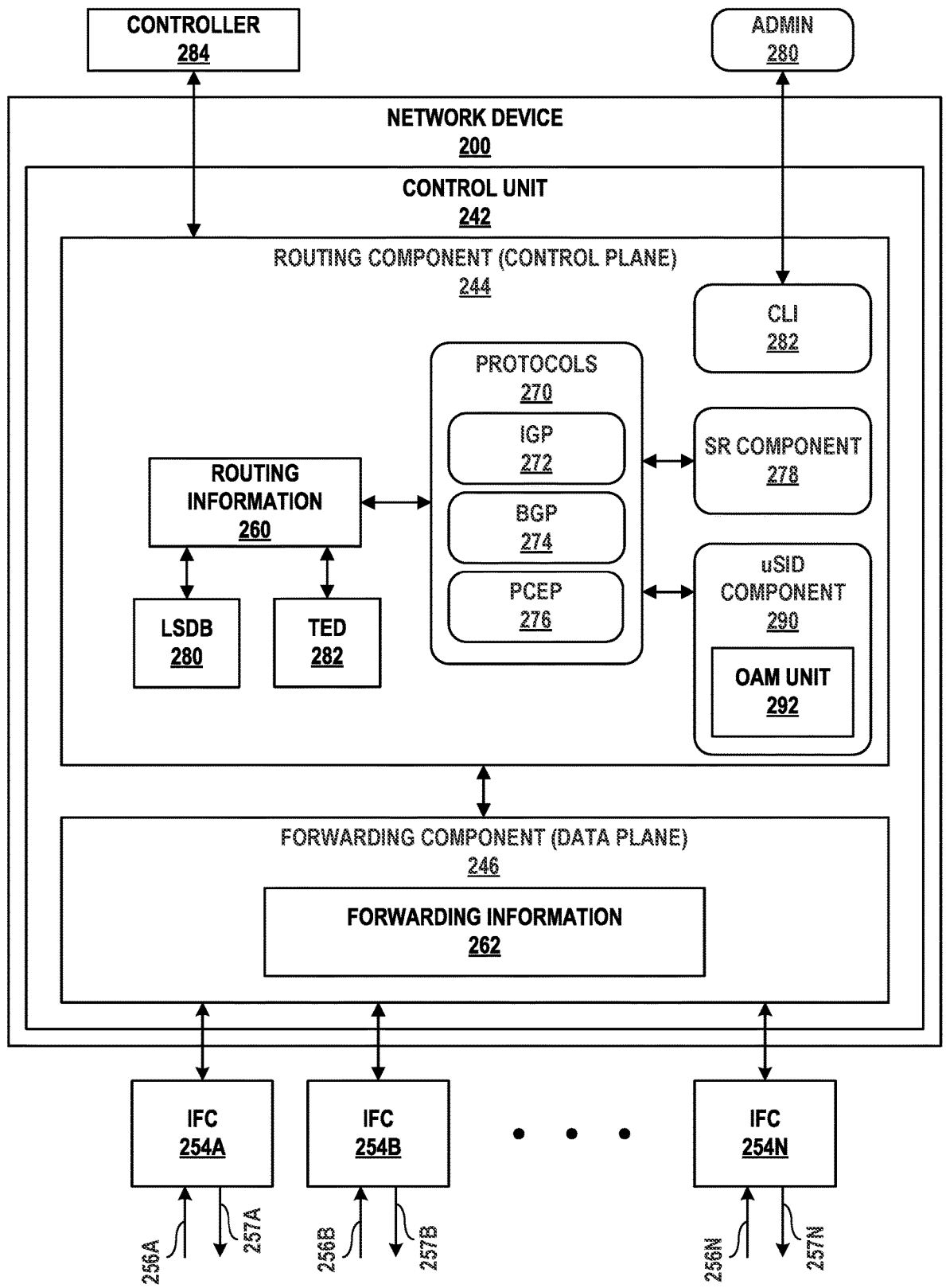
FIG. 2 is a block diagram illustrating an example network device that supports implementing OAM operations when routing packets using micro SIDs in segment routing, in accordance with techniques described in this disclosure.

FIG. 2 is a block diagram illustrating an example network device 200 that performs various aspects of the techniques described in this disclosure. Network device 200 may represent any of network devices 102 of FIG. 1. While described with respect to network device 200, the techniques may be implemented by any other type of network device capable of implementing at least routing protocols including IGPs for use in segment routing and micro SID techniques. Thus, while described with respect to network device 200, the techniques should not be limited to network device 200 described with respect to the example of FIG. 2.

In the example of FIG. 2, network device 200 includes interface cards 254A-254N ("IFCs 254") that receive packets via inbound links 256A-256N ("inbound links 256") and send packets via outbound links 257A-257N ("outbound links 257"). Network device 200 may include a chassis (not shown) having a number of slots for receiving a set of cards, including IFCs 254. Each card may be inserted into a corresponding slot of the chassis for electrically coupling the card to routing component 244 via a high-speed switch (not shown), which may comprise, for example, switch fabric, switchgear, a configurable network switch or hub, or other high-speed switching mechanisms. IFCs 254 may be coupled to links 256, 257 via a number of interface ports (not shown). Inbound links 256 and outbound links 257 may represent physical interfaces, logical interfaces, or some combination thereof.

In general, network device 200 may include a control unit 242 that determines routes of received packets and forwards the packets accordingly via IFCs 254. In the example of FIG. 2, control unit 242 includes routing component 244 (control plane) that configures and controls packet forwarding operations applied by forwarding component 246 (data plane).

Elements of control unit 242 and forwarding component 246 may be implemented solely in software, or hardware, or may be implemented as combinations of software, hardware, or firmware. For example, control unit 242 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 242 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 200, e.g., protocols, processes, and modules. Control unit 242, in some examples, retrieves and executes the instructions from memory for these aspects.

Routing component 244 provides an operating environment for execution of various routing protocols 270 that may comprise software processes having instructions executed by a computing environment. Routing component 244 is responsible for the maintenance of routing information 260 (e.g., a routing information base) to reflect the current topology of a network and other network entities to which network device 200 is connected. In particular, routing protocols periodically update routing information 260 to accurately reflect the topology of the network and other entities based on routing protocol messages received by network device 200. The protocols may be software processes executing on one or more processors. For example, routing component 244 includes network protocols that operate at a network layer of the network stack, which are typically implemented as executable software instructions.

In the example of FIG. 2, protocols 270 may include IGP component 272 to implement an IGP protocol to exchange link state information, and facilitate forwarding of packets or other data units between network devices within a routing domain. In some examples, IGP component 272 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and Internet Draft for the Network Working Group, by A. Lindem et al., entitled "OSPFv3 LSA Extendibility," dated July 2013, draft-acee-ospfv3-lsa-extend-01.txt. In some examples, IGP component 272 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990. IGP component 272 may include traffic extensions that support traffic engineering with Multi-protocol Label Switching (MPLS), as described in Internet Draft for Network Working Group, by Tony Li et al., entitled "IGP Requirements for Traffic Engineering with MPLS," dated February 1999, draft-li-mpls-igp-te-00.txt. In some examples, router 200 may include both an OSPF component and an IS-IS component.

In some examples, protocols 270 may include BGP component 274 to implement a BGP protocol to exchange link state information between or across routing domains. For example, BGP component 274 may include BGP-LS in accordance with RFC 8571, by L. Ginsberg, Ed., et al., entitled "BGP-Link State (BGP-LS) Advertisement of IGP Traffic Engineering Performance Metric Extensions," dated March 2019, the entire contents of which is incorporated by reference herein. In some examples, network device 200 may use BGP component 274 to establish a BGP session or a BGP link state (BGP-LS) session with a controller such that controller 284 may obtain link state information.

Protocols 270 may also include configuration protocols. For example, protocols 270 may include PCEP 276 in accordance with RFC 5440, by JP. Vasseur, Ed., et al, entitled "Path Computation Element (PCE) Communication Protocol (PCEP)," dated March 2009, or NETCONF (not shown) in accordance with RFC 6241, by R. Enns, Ed., et al., entitled "Network Configuration Protocol (NETCONF)," dated June 2011. In some examples, PCE 267 or central controller (e.g., SDN controller) may configure network device 200 with SIDs via PCEP 276 or a NETCONF component (not shown). Protocols 270 may include other routing protocols (not shown), such as label distribution protocol (LDP), resource reservation protocol with traffic engineering extensions (RSVP-TE), routing information protocol (RIP), or other network protocols.

Routing component 244 includes a segment routing (SR) component 278 to implement segment routing techniques for IGP protocols (e.g., IS-IS and OSPF) for specifying how network device 200 may advertise node or adjacency labels. As described above, segment routing techniques may include the SPRING paradigm. Routing component 244 includes a micro SID ("uSID") component 290 to implement micro SID techniques to steer a packet through a controlled set of instructions, called micro segments, by encapsulating the packet with a SID label stack, wherein a SID of the label stack may include one or more micro SIDs, such as in accordance with Internet-Draft, "draft-filsfils-spring-net-pgm-extension-srv6-usid-08," and Internet-Draft, "draft-filsfilscheng-spring-srv6-srh-comp-sl-enc-02," the contents of each of which is incorporated by reference above.

Routing component 244 stores routing information 260 that includes, for example, known routes through the network. Routing component 244 may include a Traffic Engineering Database (TED) 282 for storing e.g., traffic engineering information (e.g., link metrics) learned for the full network topology. In some examples, TED 282 or a separate link state database (LSDB) 280 may include segment identifier information, such as node SIDs and adjacency SIDs, and/or micro SIDs included in the topology. TED 282 may be in the form of a variety of data structures, such as a number of tables, link lists, radix trees, databases, flat files, or other data structures.

By executing the routing protocols, routing component 244 identifies existing routes through the network and determines new routes through the network. Forwarding component 246 stores forwarding information 262 that includes destinations of output links 257. Forwarding information 262 may be generated in accordance with routing information 260.

Forwarding component 246 represents hardware and logic functions that provide high-speed forwarding of network traffic. Forwarding component 246 typically includes a set of one or more forwarding chips programmed with forwarding information 262 that maps packet field values to network destinations with specific next hops and corresponding outbound interface ports. For example, routing component 244 analyzes routing information 260 and generates forwarding information 262 in accordance with routing information 260. Forwarding information 262 may be maintained in the form of one or more tables, link lists, radix trees, databases, flat files, or any other data structures. In general, when network device 200 receives a packet via one of inbound links 256, forwarding component 246 identifies an associated next hop for the data packet by traversing the programmed forwarding information 262 based on information within the packet. Forwarding component 246 forwards the packet on one of outbound links 257 mapped to the corresponding next hop, such as a tunneling endpoint or a network device in a local customer network.

In accordance with the techniques described herein, micro SID component 290 may include an OAM unit 292 to implement OAM operations when routing packets using micro SIDs. As one example, network device 200 may represent an example implementation of network device 102G of FIG. 1. In this example, when network device 200 receives packet 122C, network device 200 consumes its micro SID in the micro SID container and OAM unit 292 determines whether the destination address includes any micro SIDs (e.g., DA.argument !=0). If OAM unit 292 does not include any further micro SIDs (e.g., DA.argument=0), OAM unit 292 is configured to determine whether the packet has reached the segment routing tunnel endpoint (e.g., segments_left is 0). If OAM unit 292 determines that the packet has not reached the segment routing tunnel endpoint (e.g., segments_left is not 0), OAM unit 292 may cause network device 200 to process the packet with SRv6 techniques, such as processing a next segment identifier in the segment routing header (e.g., SR label for network device 102H), decrementing the segments_left value to zero, and forwarding the packet according to the next segment identifier. As one example, OAM unit 292 is configured to process the packet in accordance with section 4.1 of the SRv6 Network Programming draft (as described above with respect to FIG. 1).

As another example, network device 200 may represent an example implementation of network device 102H of FIG. 1. In this example, when network device 200 receives packet 122D via one of inbound links 256, OAM unit 292 determines whether the destination address includes any micro SIDs (e.g., DA.argument !=0). If OAM unit 292 does not include any further micro SIDs (e.g., DA.argument=0), OAM unit 292 is configured to determine whether the packet has reached the segment routing tunnel endpoint (e.g., segments_left is 0). If OAM unit 292 determines that the packet has reached the segment routing tunnel endpoint (e.g., segments_left is 0), OAM unit 292 may cause network device 200 to initiate OAM operations. For example, OAM unit 292 may cause network device 200 to process an upper-layer header (e.g., specifying a type of 58 which indicates the node is to ping SIDs using ICMPv6) of the packet to initiate OAM operations, such as in accordance with section 4.1.1 of the SRv6 Network Programming draft.

As another example, if OAM unit 292 does not include any further micro SIDs (e.g., DA.argument=0) and does not have a segment routing header, OAM unit 292 may cause network device 200 to initiate OAM operations (e.g., by processing an upper-layer header such as in accordance with section 4.1.1 of the SRv6 Network Programming draft).

In the examples described above, an administrator 280 may configure network device 200 via CLI 282. For example, administrator 280 may configure micro SID component 290 with an endpoint behavior to process a packet encapsulated with a micro node SID (uN) or an endpoint behavior to process a packet encapsulated with a micro adjacency SID (uA) to also include configuration to cause network device 200 to initiate OAM operations, as described in this disclosure.

Figure 3:
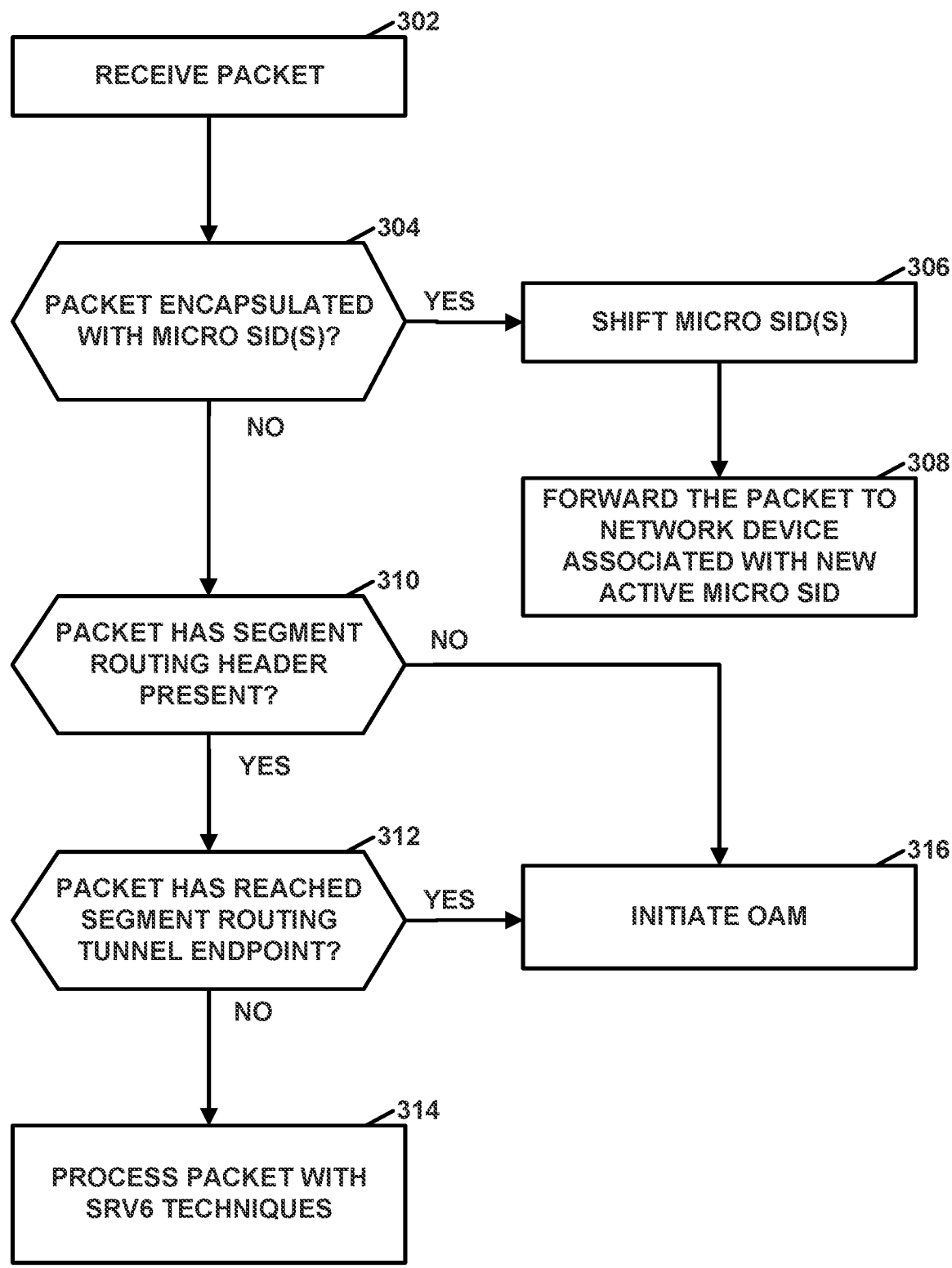
FIG. 3 is a flowchart illustrating an example operation of a network device that supports implementing OAM operations when routing packets using micro SIDs in segment routing, in accordance with techniques described in this disclosure.

FIG. 3 is a flowchart illustrating an example operation of a network device that supports implementing OAM operations when routing packets using micro SIDs in segment routing, in accordance with techniques described in this disclosure. FIG. 3 is described with respect to the operation of network devices 102 of FIG. 1.

In the example of FIG. 3, a network device enabled to use micro SIDs receives a packet (302) and determines whether the packet is encapsulated with one or more micro SIDs (304). For example, CPE 118 may send the data bound for CPE 120 to network device 102A (which may be an example ingress router). Network device 102A may encapsulate the data sent by CPE 118 and apply one or more micro SIDs within a top label (e.g., micro SID container) as shown with packet 122A. For example, network device 102A may encapsulate the data sent by CPE 118 with a source address (e.g., 118) and destination addresses (e.g., encoded as a micro SID container as FC:102C:102E:102G::) (illustrated in FIG. 1 as 118→FC:102C:102E:102G::). When network device 102C receives packet 122A, may determine that the destination address of the active micro SID is network device 102C. Network device 102C may consume its micro SID and determines whether packet 122A includes one or more other micro SIDs.

If the packet includes one or more micro SIDs ("YES" of step 304), the network device may shift the one or more micro SIDs in the micro SID container by a predetermined or identified number of bits or bytes, such as 16 bits (306). For example, network device 102C determines that packet 122A is encapsulated with one or more other micro SIDs (e.g., FC:102E:102G::) and left shifts the micro SID container to now include FC:102E:102G:: such that the next micro SID, e.g., FC:102E, is now the active micro SID, as shown in packet 122B. As one example, network device 102C determines whether the argument value of the destination address field of an IPv6 header is zero (e.g., DA.Argument !=0). In response to shifting the micro SIDs, network device 102C may forward the packet 122B to the network device associated with the new active micro SID (e.g., network device 102E) (308). Network device 102E may process packet 122B similarly as described above and forward the packet, e.g., packet 122C, to network device 102G.

If the packet does not include one or more micro SIDs ("NO" of step 304), the network device determines whether the packet has a segment routing header present (310). For example, in response to receiving packet 122C, network device 102G may consume the micro SID in packet 122C and determine packet 122C is not encapsulated with one or more other micro SIDs and in response, determines whether a segment routing header is present.

If a segment router header is not present ("NO" of step 310) in the packet, the network device may initiate OAM operations (316), e.g., by processing the upper-layer header of the packet (e.g., in accordance with section 4.1.1 of the SRv6 Network Programming draft. If a segment router is present ("YES" of step 310), the network device may determine whether the packet has reached a segment routing tunnel endpoint (312). For example, in response to determining that a segment routing header is present in packet 122C, network device 102G may determine that the packet has not reached segment routing tunnel endpoint ("NO" of step 312) and processes the packet with SRv6 techniques. For example, network device 102G may determine whether packet 122C has a segments_left value is zero. In some examples, if network device 102G determines that the packet has not reached the segment routing tunnel endpoint (e.g., segments_left is not 0), network device 102G may process the packet with SRv6 techniques, such as processing a next segment identifier in the segment routing header (e.g., SR label for network device 102H), decrementing the segments_left value to zero, and forwarding the packet according to the next segment identifier (e.g., in accordance with section 4.1 of the SRv6 Network Programming draft for a network device configured with a micro node SID endpoint behavior; or in accordance with section 4.2 of SRv6 Network Programming draft for a network device configured with a micro adjacency SID endpoint behavior). For instance, as all the micro SIDs in the micro SID container in the top label has been consumed, network device 102G may pop the top label, resulting in the SR label 102H:: label being the top label as is shown in packet 122D. Network device 102G may determine the location of network device 102H based on advertisements sent by network device 102H and may forward packet 122D to network device 102H.

If the packet has reached a segment routing tunnel endpoint ("YES" of step 312), the network device may initiate OAM operations (316). For example, network device 102H may receive packet 122D and determine that the segments_left value is zero. In response, network device 102H may process an upper-layer header (e.g., specified as type 58) that specifies a type (e.g., type 58) that is associated with OAM and performs one or more OAM operations (e.g., ping or traceroute).

The techniques described herein may be implemented in hardware, software, firmware, or any combination thereof. Various features described as components, units or modules may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software components or hardware components.

What is claimed is:

1. A method comprising:
   receiving, by a network device enabled to use micro segment identifiers (SIDs), a packet;
   determining, by the network device, whether the packet is encapsulated with one or more micro SIDs;
   in response to determining the packet is not encapsulated with one or more micro SIDs, determining, by the network device, whether the packet has reached a segment routing tunnel endpoint; and
   in response to determining that the packet has reached the segment routing tunnel endpoint, initiating, by the network device, one or more Operations, Administration, and Maintenance (OAM) operations.

2. The method of claim 1, wherein initiating one or more OAM operations comprises:
   processing an upper-layer header of the packet, wherein the upper-layer header of the packet specifies a type value associated with OAM; and
   performing, by the network device and based on processing the upper-layer header specifying the type value associated with OAM, the one or more OAM operations.

3. The method of claim 1, wherein the one or more OAM operations comprises at least one of ping and traceroute.

4. The method of claim 1, wherein determining that the packet is not encapsulated with one or more micro SIDs comprises determining that an argument value of a destination address field of an Internet Protocol version 6 header is zero.

5. The method of claim 1, wherein determining that the packet has reached the segment routing tunnel endpoint comprises determining that a segments left value of the packet is zero.

6. The method of claim 1, wherein the network device comprises a first network device of a plurality of network devices that are enabled to use micro SIDs, wherein the packet comprises a first packet, the method further comprising:
   receiving, by the first network device, a second packet encapsulated with one or more micro SIDs, wherein the one or more micro SIDs of the second packet comprises an active micro SID associated with the first network device and a next micro SID associated with a second network device of the plurality of network devices;
   consuming, by the first network device, the active micro SID associated with the first network device;
   determining, by the first network device, that the second packet is encapsulated with one or more other micro SIDs;
   in response to determining that the second packet is encapsulated with one or more other micro SIDs, shifting the next micro SID to a location that was previously occupied by the active micro SID to become a new active micro SID of the second packet; and
   forwarding, by the network device and in response to shifting the next micro SID, the second packet toward the second network device associated with the new active micro SID.

7. The method of claim 1, wherein the network device comprises a first network device of a plurality of network devices that are enabled to use micro SIDs, wherein the packet comprises a first packet, the method further comprising:
   receiving, by the first network device, a second packet;
   determining, by the first network device, that the second packet is not encapsulated with one or more micro SIDs;
   in response to determining the packet is not encapsulated with one or more micro SIDs, determining, by the first network device, that the second packet has not reached a segment routing tunnel endpoint;
   in response to determining that the second packet has not reached the segment routing tunnel endpoint, processing, by the first network device, a next header of the second packet; and
   forwarding, by the first network device and based on the next header of the second packet, the second packet to a second network device of the plurality of network devices, wherein the second network device is associated with the next header.

8. The method of claim 7, wherein the next header of the packet comprises a next segment identifier in a segment routing header of the packet.

9. The method of claim 1, wherein the packet comprises a first packet, the method further comprising:
receiving, by the network device, a second packet;
determining, by the network device, that the second packet is not encapsulated with one or more micro SIDs; and
initiating, by the network device and if the second packet does not include a segment routing header, the one or more OAM operations.

10. A network device comprising:
one or more processors configured to:
receive a packet;
determine whether the packet is encapsulated with one or more micro segment identifiers (SIDs);
in response to a determination that the packet is not encapsulated with one or more micro SIDs, determine whether the packet has reached a segment routing tunnel endpoint; and
in response to a determination that the packet has reached the segment routing tunnel endpoint, initiate one or more Operations, Administration, and Maintenance (OAM) operations.

11. The network device of claim 10, wherein to initiate one or more OAM operations, the one or more processors are configured to:
process an upper-layer header of the packet, wherein the upper-layer header specifies a type value associated with OAM; and
perform, based on processing the upper-layer header that specifies the type value associated with OAM, the one or more OAM operations.

12. The network device of claim 10, wherein the packet comprises a first packet, the one or more processors are further configured to:
receive a second packet;
determine that the second packet is not encapsulated with one or more micro SIDs; and
initiate, if the second packet does not include a segment routing header, the one or more OAM operations.

13. The network device of claim 10, wherein to determine that the packet is not encapsulated with one or more micro SIDs, the one or more processors are configured to determine that an argument value of a destination address field of an Internet Protocol version 6 header is zero.

14. The network device of claim 10, wherein to determine that the packet has reached the segment routing tunnel endpoint, the one or more processors are configured to determine that a segments left value of the packet is zero.

15. The network device of claim 10, wherein the network device comprises a first network device of a plurality of network devices enabled to use micro SIDs, the one or more processors are further configured to:
receive a second packet encapsulated with one or more micro SIDs, wherein the one or more micro SIDs of the second packet comprises an active micro SID associated with the first network device and a next micro SID associated with a second network device of the plurality of network devices;
consume the active micro SID associated with the first network device;
determine that the second packet is encapsulated with one or more other micro SIDs;
in response to a determination that the second packet is encapsulated with one or more other micro SIDs, shift the next micro SID to a location that was previously occupied by the active micro SID to become a new active micro SID of the second packet; and
in response to shifting the next micro SID, forward the second packet toward the second network device associated with the new active micro SID.

16. The network device of claim 10, wherein the network device comprises a first network device of a plurality of network devices that are enabled to use micro SIDs, wherein the packet comprises a first packet, the one or more processors are further configured to:
receive a second packet;
determine that the second packet is not encapsulated with one or more micro SIDs;
in response to a determination that the second packet is not encapsulated with one or more micro SIDs, determine that the second packet has not reached a segment routing tunnel endpoint;
in response to a determination that the second packet has not reached the segment routing tunnel endpoint, process a next header of the second packet; and
forward, based on the next header of the second packet, the second packet to a second network device of the plurality of network devices, wherein the second network device is associated with the next header.

17. The network device of claim 16, wherein the next header of the packet comprises a next segment identifier in a segment routing header of the packet.

18. A non-transitory computer-readable medium storing instructions, which when executed, cause processing circuitry of a network device to:
receive a packet;
determine whether the packet is encapsulated with one or more micro segment identifiers (SIDs);
in response to a determination that the packet is not encapsulated with one or more micro SIDs, determine whether the packet has reached a segment routing tunnel endpoint; and
in response to a determination that the packet has reached the segment routing tunnel endpoint, initiate one or more Operations, Administration, and Maintenance (OAM) operations.

19. The non-transitory computer-readable storage medium of claim 18, wherein the instruction further cause the processing circuitry to:
process an upper-layer header of the packet, wherein the upper-layer header of the packet specifies a type value associated with OAM; and
perform, based on processing the upper-layer header specifying the type value associated with OAM, the one or more OAM operations.

20. The non-transitory computer-readable storage medium of claim 18,
wherein the instructions that cause the processing circuitry to determine that the packet is not encapsulated with one or more micro SIDs, the instructions further cause the processing circuitry to determine that an argument value of a destination address field of an Internet Protocol version 6 header is zero, and
wherein to determine that the packet has reached the segment routing tunnel endpoint, the instructions further cause the processing circuitry to determine that a segments left value of the packet is zero.

* * * * *